(12) United States Patent
Das

(10) Patent No.: US 8,776,036 B2
(45) Date of Patent: Jul. 8, 2014

(54) DETERMINING SUPPORT CRITERIA FOR SHARED LIBRARIES BASED ON THEIR PRIORITY LEVELS

(75) Inventor: Kushal Das, West Bengal (IN)

(73) Assignee: Red Hat, Inc., Raleigh, NC (US)

( * ) Notice: Subject to any disclaimer, the term of this patent is extended or adjusted under 35 U.S.C. 154(b) by 482 days.

(21) Appl. No.: 12/953,084

(22) Filed: Nov. 23, 2010

(65) Prior Publication Data

US 2012/0131538 A1    May 24, 2012

(51) Int. Cl.
| | | |
|---|---|---|
| *G06F 9/44* | (2006.01) | |
| *G06F 9/45* | (2006.01) | |
| *G06Q 40/00* | (2012.01) | |
| *G06F 15/173* | (2006.01) | |
| *G06F 13/00* | (2006.01) | |
| *G06F 13/28* | (2006.01) | |
| *G06F 3/00* | (2006.01) | |

(52) U.S. Cl.
USPC ........... 717/163; 717/107; 717/110; 717/124; 717/127; 717/147; 717/148; 717/168; 705/35; 709/226; 711/114; 711/203; 719/310

(58) Field of Classification Search
CPC ......... G06F 9/44; G06F 9/465; G06F 9/5066; G06F 9/44521; G06F 8/70; G06F 11/30; G06F 11/3604
See application file for complete search history.

(56) References Cited

U.S. PATENT DOCUMENTS

| | | | |
|---|---|---|---|
| 5,878,429 A | 3/1999 | Morris et al. | |
| 5,923,882 A * | 7/1999 | Ho et al. | 717/147 |
| 6,047,362 A * | 4/2000 | Zucker | 711/203 |
| 6,260,075 B1 * | 7/2001 | Cabrero et al. | 719/310 |
| 7,051,038 B1 | 5/2006 | Yeh et al. | |
| 7,203,946 B2 * | 4/2007 | Johnson et al. | 717/124 |
| 7,389,311 B1 * | 6/2008 | Crescenti et al. | 709/226 |
| 7,458,022 B2 | 11/2008 | Ramarao | |
| 7,739,282 B1 | 6/2010 | Smith et al. | |
| 7,774,757 B1 * | 8/2010 | Awasthi et al. | 717/127 |
| 7,945,902 B1 * | 5/2011 | Sahoo | 717/131 |
| 7,971,183 B2 * | 6/2011 | Grechanik et al. | 717/107 |

(Continued)

OTHER PUBLICATIONS

Richard S. Piepho et al., A Comparison of RISC Architectures, IEEE 1989, [Retrieved on Oct. 2, 2012]. Retrieved from the Internet: <URL: http://ieeexplore.ieee.org/stamp/stamp.jsp?tp=&arnumber=31487> 12 Pages (51-62).*

(Continued)

*Primary Examiner* — Don Wong
*Assistant Examiner* — Anibal Rivera
(74) *Attorney, Agent, or Firm* — Lowenstein Sandler LLP

(57) ABSTRACT

A mechanism for determining support criteria for shared libraries based on their priority levels is described. A method of embodiments of the invention includes extracting interface provisioning detail relating to interfaces associated with shared libraries provided by an operating system running on a computer system. The interfaces include application binary interfaces (ABIs). The method further includes detecting interface usage detail associated with the interfaces. The interface usage detail is based on a frequency at which one or more interfaces are used by one or more third-party software programs running on the operating system. The method further includes comparing the interface provisioning detail with the interface usage detail to determine an importance level of each shared library, and analyzing comparison results obtained from the comparison. The analyzing includes assigning a priority level to each shared library based on its importance level.

20 Claims, 4 Drawing Sheets

(56) References Cited

U.S. PATENT DOCUMENTS

| | | | |
|---|---|---|---|
| 7,971,184 B2* | 6/2011 | Grechanik et al. | 717/107 |
| 7,979,846 B2* | 7/2011 | Grechanik et al. | 717/124 |
| 7,984,429 B2* | 7/2011 | Hunt | 717/130 |
| 8,204,809 B1* | 6/2012 | Wise | 705/35 |
| 2003/0217193 A1* | 11/2003 | Thurston et al. | 717/170 |
| 2003/0229890 A1* | 12/2003 | Lau et al. | 717/168 |
| 2005/0138111 A1 | 6/2005 | Aton et al. | |
| 2006/0059253 A1 | 3/2006 | Goodman et al. | |
| 2006/0069961 A1* | 3/2006 | Kalyanaraman | 714/38 |
| 2006/0141983 A1 | 6/2006 | Jagannathan et al. | |
| 2006/0184930 A1* | 8/2006 | Fuente et al. | 717/168 |
| 2007/0011667 A1* | 1/2007 | Subbiah et al. | 717/148 |
| 2007/0056037 A1 | 3/2007 | Focke et al. | |
| 2007/0168957 A1 | 7/2007 | Li et al. | |
| 2007/0294673 A1 | 12/2007 | Guerrera et al. | |
| 2008/0244177 A1* | 10/2008 | Crescenti et al. | 711/114 |
| 2009/0037896 A1* | 2/2009 | Grechanik et al. | 717/168 |
| 2009/0276771 A1 | 11/2009 | Nickolov et al. | |
| 2010/0195503 A1 | 8/2010 | Raleigh | |
| 2010/0226594 A1 | 9/2010 | Mikawa | |
| 2010/0306737 A1* | 12/2010 | Hamilton, II et al. | 717/110 |
| 2010/0318947 A1* | 12/2010 | Motiani et al. | 716/104 |
| 2012/0131539 A1 | 5/2012 | Das | |
| 2012/0131563 A1 | 5/2012 | Das | |
| 2012/0131564 A1 | 5/2012 | Das | |
| 2012/0209895 A1 | 8/2012 | He et al. | |

OTHER PUBLICATIONS

Denis Silakov et al., Improving Portability of Linux Application by Early Detection of Interoperability Issues, 2010 [Retrieved on Oct. 2, 2012]. Retrieved from the internet: <URL: http://www.springerlink.com/content/6271n751523807p2/fulltextpdf> 14 Pages (357-370).*

Ulrich Drepper et al., The Native POSIX Thread Library for Linux, 2003, [Retrieved on Jul. 11, 2013]. Retrieved from the internet: <URL: http://www.cs.utexas.edu/~witchel/372/lectures/POSIX_Linux_Threading.pdf> 20 Pages (1-20).*

Martin Wolpers et al., Tracking Actual Usage: the Attention Metadata Approach, 2007, [Retrieved on Mar. 5, 2014]. Retrieved from the internet: <URL: http://eds.a.ebscohost.com/ehost/pdfviewer/pdfviewer?sid=2f23b7ec-330f-47b5-857f-0f3355941e52%40sessionmgr4001&vid=2&hid=4102> 17 Pages (106-121).*

Victor Eijkhout et al., A Standard and Software for Numerical Metadata, Feb. 2009, [Retrieved on Mar. 5, 2014]. Retrieved from the internet: <URL: http://dl.acm.org/citation.cfm?id=1462174> 20 Pages (1-20).*

"ELF-64 Object File Format" retrieved from the Internet at http://downloads.openwatcom.org/ftp/devel/docs/elf-64-gen.pdf. May 27, 1998 Version 1.5, Draft 2. 18 pages.

USPTO, Office Action for U.S. Appl. No. 12/953,286 mailed on Nov. 1, 2012.

Library Usage (Published Jul. 12, 2008) retrieved from http://www.the-interweb.com/bdump/misc/top2000.txt, 22 pages.

Library Rank List (Published 2009) retrieved from http://www.the-interweb.com/serendipity/index.php?/archives/109-Some-Win32-API-usage-statistics.html, 4 pages.

Lerch, Ryan, "Red Hat Enterprise Linux 5.3", Release Notes, copyright 2008, pp. 1-240 <Release_Notes_08.pdf>.

Library Usage (Published Jul. 12, 2008) retrieved from http://www.the-interweb.com/serendipity/index.php?/archives/109-Some-Win32-API-usage-statistics.html on May 24, 2013.

Google Books, "Leveraging Applications of Formal Methods, Verification, and Validation: 4th International Symposium on Leveraging Applications," ISoLA 2010, Heraklion, Crete, Greece, Oct. 18-21, 2010, Proceedings; published Dec. 23, 2010; retrieved from http://books.google.com/books?id=j8PFfxikBZQC on Dec. 2, 2013.

Springer Link, "Daniel Silakov et al., Improving Portability of Linux Application by Early Detection of Interoperability Issues: 4th International Symposium on Leveraging Applications," ISoLA 2010, Heraklion, Crete, Greece, Oct. 18-21, 2010, Proceedings, Part II; published 2010;retrieved from http://link.springer.com/chapter/10.1007%2F978-3-642-16561-0_34 on Dec. 2, 2013.

USPTO; Office Action for U.S. Appl. No. 12/953,285, mailed May 9, 2013.

USPTO; Office Action for U.S. Appl. No. 12/953,285, mailed Oct. 1, 2013.

USPTO; Office Action for U.S. Appl. No. 12/953,285, mailed Dec. 17, 2013.

USPTO; Office Action for U.S. Appl. 12/953,286 mailed Apr. 29, 2013.

USPTO; Office Action for U.S. Appl. 12/953,286 mailed Aug. 9, 2013.

USPTO; Office Action for U.S. Appl. 12/953,023 mailed May 22, 2013.

USPTO; Office Action for U.S. Appl. 12/953,023 mailed Oct. 17, 2013.

USPTO; Office Action for U.S. Appl. 12/953,023 mailed Jan. 14, 2014.

* cited by examiner

DETERMINING SUPPORT CRITERIA FOR SHARED LIBRARIES BASED ON THEIR PRIORITY LEVELS

RELATED APPLICATIONS

The present application is related to co-filed U.S. patent application Ser. No. 12/953,385 entitled "Process of Finding Out if Software Will Run on an Operating System Without Installing That Software" and U.S. patent application Ser. No. 12/953,286 entitled "Find and Track Information of Interface Usage of Software Libraries by Other Software" and U.S. patent application Ser. No. 12/953,023 entitled "Mechanism for Providing Customized Visualization of Application Binary Interface/Application Programming Interface-Related Information", which are assigned to the assignee of the present application.

TECHNICAL FIELD

The embodiments of the invention relate generally to software compatibility and, more specifically, relate to providing a mechanism for determining support criteria for shared libraries based on their priority levels.

BACKGROUND

Multiple software programs that run on a computing device often share libraries provided by the based operating system employed at the computing device. For example, these libraries can be used by the software programs to access various library or operating system functions (e.g., reading files, writing files, file management, network communications, inter-process communications, memory management, string manipulations, user interface manipulations, mathematics functions, etc.). Typically, these libraries change when the operating system changes or is updated; for example, upgrading to a newer version of an operating system can change the functions presented in one or more shared libraries, change versions and arguments used in these functions, and/or change functionalities of some, none or all of the library functions. As a result, a software program developed for one operating system may not work on another operating system and, similarly, upgrading to the new operating system may cause a software program not to work on the new or updated operating system. To determine whether a software program is executable on a new or updated operating system, the software program is typically re-compiled to run on the new or updated operating system.

The aforementioned re-compiling and re-running of the software program is further complicated when multiple software programs are involved and further, they include customer-generated software programs (e.g., third-party software programs that are created and provided by sources independent of the one providing the operating system and shared libraries). Furthermore, a user (e.g., software developer, system administrator, etc.) remains unaware as to which of the shared libraries are important to the multiple third-party software programs running on the operating system; consequently, by updating a shared library provided by the base operating system, the user risks breaking existing software and adding to inefficiency by wasting system resources.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
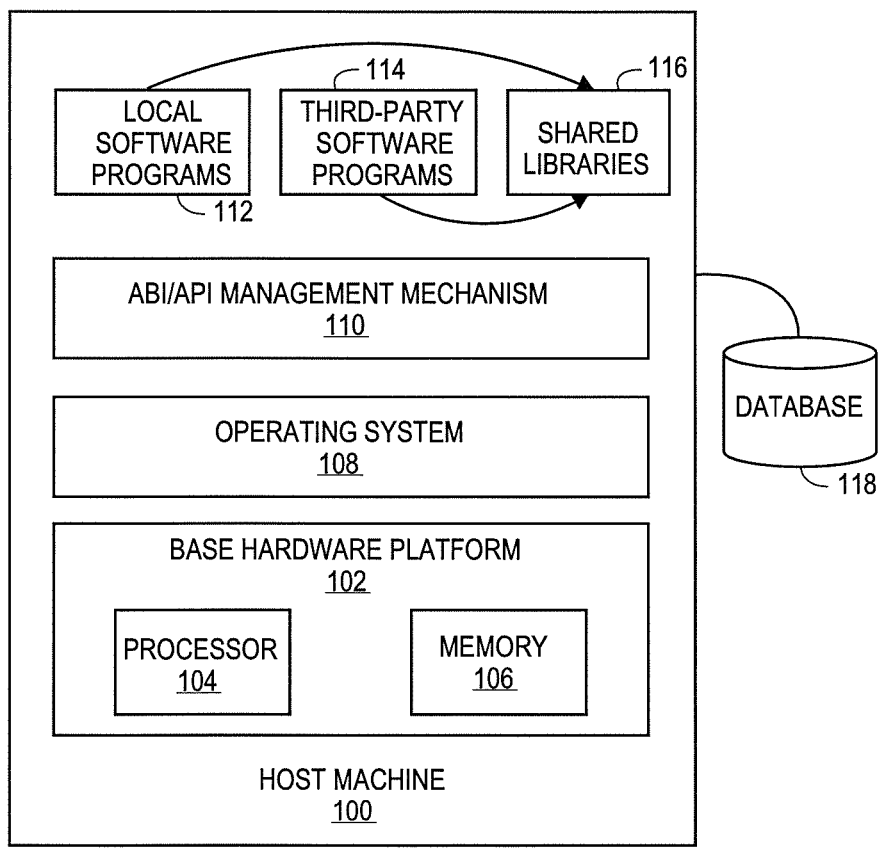
FIG. 1 illustrates a host machine employing application binary interface/application programming interface management mechanism according to one embodiment of the invention.

Embodiments of the invention provide a mechanism for determining support criteria for shared libraries based on their priority levels is described. A method of embodiments of the invention includes extracting interface provisioning detail relating to interfaces associated with shared libraries provided by an operating system running on a computer system. The interfaces include application binary interfaces (ABIs). The method further includes detecting interface usage detail associated with the interfaces. The interface usage detail is based on a frequency at which one or more interfaces are used by one or more third-party software programs running on the operating system. The method further includes comparing the interface provisioning detail with the interface usage detail to determine an importance level of each shared library, and analyzing comparison results obtained from the comparison. The analyzing includes assigning a priority level to each shared library based on its importance level.

The embodiments of the present invention are provided for determining support criteria for shared libraries based on their priority levels. In one embodiment, ABIs/application programming interfaces (APIs) provisioning data (including a list of ABIs and APIs associated with shared libraries and their associated metadata) relating to software programs running on a computer system is extracted and stored on a database in communication with the computer system. Further, ABI/API usage detail of various ABIs and APIs being accessed and used by third-party software programs is detected and stored in the database. In one embodiment, ABI/API provisioning and usage details are compared with each other and then analyzed to determine priority levels of various shared libraries. These priority levels allow a user to assess a level of importance associated with each shared library.

These priority levels are then used by the provider of the shared libraries to establish support criteria for the shared libraries, such as to provide a higher customer support for a library that has a high priority level as opposed to the one that is assigned a lower priority level. The provider uses the support criteria for shared libraries to address its customers' requests based on their changing needs and thus, to provide better customer services. Further, for example, the provider may choose to collect fees from its customers based on the support criteria they enjoy for the shared libraries used by their third-party software programs. As will be discussed throughout this document, the provider here refers to a company or organization responsible for creating and providing the base operating system, the shared libraries, and local software programs, while a customer or third-party refers to a company or organization responsible for generating and providing the third-party software programs. Further, shared libraries and the related interfaces (e.g., ABI, API) may be accessed and used by one or more third-party software programs as well as by one or more local software programs that are part of the operating system and independent of the one or more third-party software programs. ABI and/or API refer to and may include data-identifying ABIs and/or APIs, such as those providing identifying names, locations, IDs, versions, etc. The user refers to a computer programmer or system administrator associated with the provider.

FIG. 1 illustrates a host machine 100 employing ABI/API management mechanism 110 according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and a user. In some embodiments, base hardware platform 102 may include a processor 104, memory devices 106, network devices, drivers, and so on. Host machine 100 may include a server computing system or a client computing system. Further, terms like "machine", "device", "computer", and "computing system" are used interchangeably and synonymously throughout this document.

In one embodiment, host machine 100 employs ABI/API management mechanism 110 ("ABI/API mechanism") to manage ABIs and APIs and their associated metadata, such as the metadata that describes which shared library 116 provides which ABI and/or API and of what version along with identifying those Executable and Linkable Format (ELF)/binary files that consume them. ABI/API mechanism 110 detects and extracts the ABI/API metadata and stores it in a database 118. The ABI/API metadata, in one embodiment, includes ABI/API provisioning detail and ABI/API usage detail as will be described later in this document. The ABI/API provisioning detail, for example, includes the number of ABIs and/or APIs associated with each shared library 116 for various local software programs 112, the known use of such ABIs and APIs, various library or operating system functions associated with each ABI/API and the importance of each of those operating system functions, etc. On example of ABI/API provisioning detail includes a prominent shared library like glibc/libc.so.6 that provides an ABI strcmp which can be found in several applications and thus can be significantly important due to its high use frequency. The ABI/API usage detail, in one embodiment, includes the usage detail of each ABI and/or API and its associated shared library as it relates to each of the third-party software programs 114. For example, depending on the importance of a library or operating system function (e.g., something as simple as printing, deleting, etc.) to a third-party software program 114, an ABI and/or API associated with that operating function is expected to be frequently accessed and used by that third-party software program 114; hence, indicating the usage (and thus, the importance) of the ABI and/or API and its associated shared library 116. Further, shared libraries 116 and the related interfaces (e.g., ABI, API) may be accessed and used by one or more third-party software programs 114 as well as by one or more local software programs (e.g., including, but not limited to, local software programs 112) that are part of (and/or provided by the same host or provider that provided) the operating system 108 and independent of the one or more third-party software programs 114. As aforementioned, ABI and/or API refer to and may include data-identifying ABIs and/or APIs, such as those providing identifying names, locations, IDs, versions, etc.

The database 118 includes a storage device that is either employed on the host machine 100 or remotely located on another machine that is in communication with the host machine 100. In one embodiment, ABI/API provisioning and usage details are then compared and analyzed by the ABI/API mechanism 110 to determine priority levels of various shared libraries 116. These priority levels may then be used by the provider (e.g., organization or company that creates and/or provides the operating system 108, the shared libraries 118, the local software program 112, etc.) to establish support criteria for the shared libraries 116 (such as to provide better customer support criteria for a shared library that has a high priority level as opposed to the one that is assigned a lower priority level) to address and satisfy its customers' changing requests and needs. Shared libraries 116 refer to those libraries that are accessed and used by both the local and third-party software programs 112, 114 to perform various operating system or library functions (e.g., reading files, writing files, file management, network communications, inter-process communications, memory management, string manipulations, user interface manipulations, mathematics functions, etc.).

As is known in the art, a library is a collection of classes and subroutines that are used to develop and support software programs, such as representing code and data that provide services to both local and other independent software programs 112, 114. For example, an operating system 108 provides shared libraries 116 to implement aforementioned system functions that are used by various local and third-party software programs 112, 114. Other libraries may be provided by and specific to third-party software programs 114 created and provided by third-party providers (e.g., a third-party software development company or organization other than the provider responsible for creating and providing the operating system 108 and the shared libraries 116).

Each library provides a collection or group of ABIs. An ABI represents a compiled binary form of a function serving as a low-level interface between software programs 112, 114 and the operating system 108. When a function is broken, such as a print function (e.g., when a print command executes double prints or does not print the entire text (e.g., prints "hell" when asked to print "hello")), etc., the broken function indicates a possible problem with the corresponding ABI and the associated library. In one embodiment, an ABI may include details relating to data types, sizes, alignments, calling conventions, symbol versions, system call numbers, binary format of object files, etc. An API refers to a library including routines to call, data structures to manipulate, and/or object classes to use, etc. Although ABI and API are referenced together as "ABI/API" throughout this document, it is contemplated that the ABI/API mechanism 110 may be used with ABIs and/or APIs, as necessitated or desired.

As aforementioned, a third-party or customer software program 114 represents a software program that is developed by someone other than the provider that produces the operating system 108 and the shared libraries 116. For example, a third-party software program 114 may include a special-purpose software program that is used for or by an organization (e.g., media development software for media companies, specialized modeling software, etc.) and, like a local software program 112, accesses and uses any number of shared libraries 116 to utilize system functions.

Figure 2:
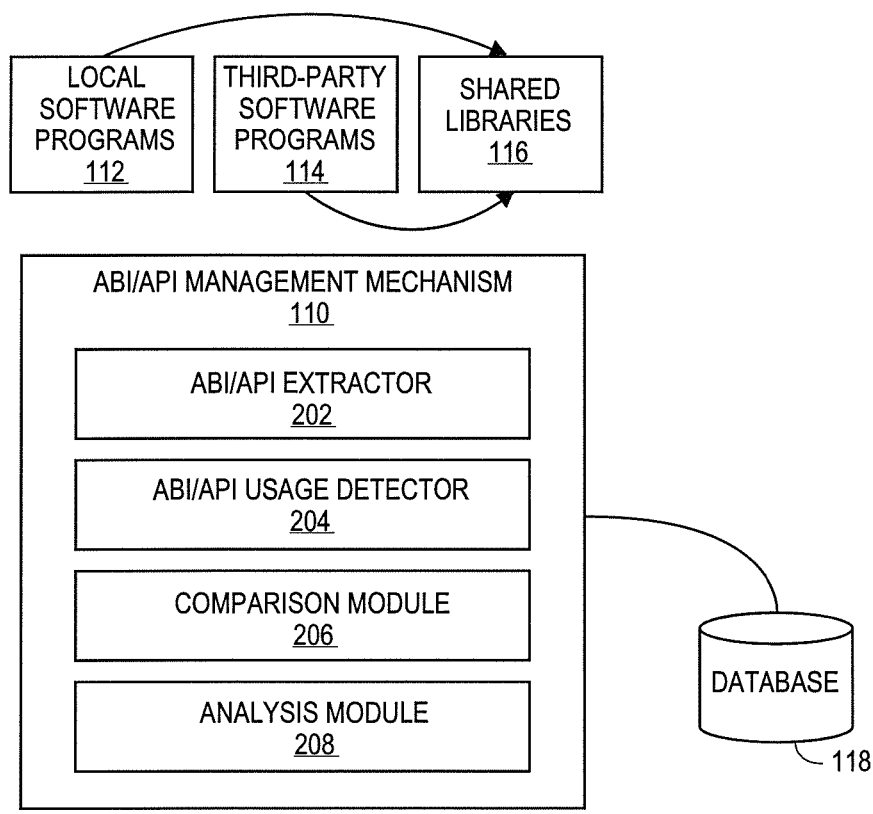
FIG. 2 illustrates application binary interface/application programming interface management mechanism according to one embodiment of the invention.

FIG. 2 illustrates ABI/API management mechanism 110 according to one embodiment of the invention. In one embodiment, ABI/API mechanism 110 extracts provisioning details of various ABIs and APIs relating libraries 116 as accessed and used by various local and third-party software programs 112, 114. The provisioning details include, for example and as aforementioned, the number of ABIs and/or APIs associated with each shared library 116 for various local software programs 112, the known use of such ABIs and APIs, various library or operating system functions associated with each ABI/API and the importance of each of those operating system functions, etc. In one embodiment, ABI/API mechanism 110 stores the ABI/API provisioning detail in a database 118 so it can be used for comparison and analysis for assigning priority levels to various shared libraries 116. These priority levels are then used by the provider to form support criteria for each shared library 116 and provide them to its customers (e.g., third-party software program providers) so the third-party software programs 114 can have an improved and more efficient run on the operating system.

In one embodiment, ABI/API extractor 202 finds and extracts ABIs and/or APIs associated with various operating system functions associated with and provided by the shared libraries 116. ABIs and APIs may generally refer to data identifying names, locations, IDs, versions, etc. ABI/API extractor 202, in one embodiment, using, for example, a library controller or installer, scans through the base operating system, the local software programs 112, and the shared libraries 116 to find and extract their ABIs and/or APIs and any metadata associated with them. Metadata may refer to various versions of any given ABI, API and/or library and where they come from, such as ndx, value, bind value, whether they are internal or not, type of ABI/API/library, etc. These extracted ABIs and/or APIs and the associated metadata are organized as ABI/API provisioning detail and stored in the database 118.

Similarly, in one embodiment, ABI/API usage detector 204 detects the use of various shared libraries 116 by third-party software programs 114. For example, ABI/API detector checks the various ABIs and/or APIs associated with various system functions that are important to the third-party software programs 114 or monitors the access and use of relevant ABIs and/or API that are accessed and used by the third-party software programs 114 to perform the important system functions. The information can then be used to determine which of the shared libraries 116 are important (e.g., frequently accessed or used) to the third-party software programs 114. Once the ABI/API usage detail is detected, it is then stored in the database 118. In one embodiment, the importance of a shared library 116 depends on the usage frequency of an ABI/API based on its association with a library or operating system function. For example, if a third-party software program 114 is known for printing documents, then that third-party software program 114 is expected to use a particular library function that relates to printing (e.g., print library function) with a greater frequency than many of the other library functions and even more than by some of the other third-party software programs 114. The aforementioned monitoring of the ABIs/APIs can tell us the important of a particular ABI/API, such as in this example, an ABI/API that is associated with a shared library 116 that relates to the print library function. Similarly, the use of other library or operating system functions (and consequently, the use of their associated ABIs/APIs) can be monitored, and from the monitoring data, the importance of such ABIs/APIs can be determined; for example, the higher the usage of an ABI/API, the higher the importance of a shared library 116 associated with that ABI/API and vice versa. In one embodiment, the aforementioned monitoring of ABIs and/or APIs may be performed by scanning a software code of the local and/or third-party software programs 112, 114, or in real-time while executing the local and/or third-party software programs 112, 114. One example of a monitoring technique includes keeping the usage detail of ABIs/APIs by a local or third-party software and adding a new software into a list to check after regular intervals whether they are still using the same ABI/API or not. Further, an in-between check is performed to determine whether there is any breakage in the ABI/API.

In one embodiment, a comparison module 206 compares the ABI/API provisioning detail with the ABI/API usage detail to determine the importance level of each shard library 116 as it relates to one or more system functions that are important to and used by one or more of the third-party software programs 114. For example, of the shared libraries 116, those shared libraries that relate to those library functions that are more frequently used by various third-party software programs 114 are regarded as more important than those shared libraries that are associated with those library functions that are less frequently used or not used at all by the third-party software programs 114. Although it is not necessary that an important threshold be assigned to a shared library 116, in one embodiment, a user may set one or more threshold levels to classify importance of shared libraries 116. For example, a first shared library 116 that is used more than 200 times by any of the third-party software programs 114 and/or by more than 5 third-party software programs 114 may be regarded as extremely important, while a second shared library 116 that is used 150-199 times and/or by 4 third-party software programs 114 may be classified as important, and similarly, a third shared library 116 that is used 100-149 times and/or by 3 third-party software programs may be regarded as moderately important, and so forth. It is contemplated that these classifications or threshold levels as well as other factors (e.g., customer history, customer needs, etc.) may be taken into consideration when forming support criteria for shared libraries 116. In one embodiment, the comparison of the ABI/API provisioning detail with the ABI/API usage detail points out the importance of each shared library 116 based on its access and use by one or more of the third-party software programs 114 (as represented by an ABI and/or API corresponding to a system function). The comparison results are stored in the database 118. It is contemplated that a particular third-party software program may provide various libraries that are exclusive to the execution of that particular third-party software program and may be part of a greater set of libraries but remain irrelevant to the shared libraries 116.

An analysis module 208, in one embodiment, analyzes the comparison results obtained from the ABI/API provisioning and usage details comparison performed by the comparison module 206. The analysis of the comparison results includes the analysis module 208 assigning a priority level to each shared library 116 according to its importance level gathered from the comparison results. For example, the higher the importance of a shared library 116 according to the comparison results, the higher the priority level assigned to it by the analysis module 208. Further, in one embodiment, the analysis module 208 includes intelligence and decision making component to recommend support criteria policies for the shared libraries 116 based on their assigned priority levels as well as one or more of user-defined predetermined criteria, customer requests, customer history, system bandwidth, and/or third-party software program usage history, etc. For example, using these recommended support criteria policies, the provider may decide to establish an extensive support criteria for those shared libraries that are identified as being frequently used, such as used by five or more of the third-party software programs 116, while establish a somewhat lesser support criteria for other less-popular shared libraries, or the like. Further, for example, certain large and often-used libraries (e.g., glibc) are known to be important, but using the ABI/API mechanism 110, even a relatively small and rarely-used library (e.g., lib.b.2, libfreedom, etc.) may also be determined to be important, for example, to a particular customer based on its third-party software program's use of that small library. Thus, having known the importance of this library, in one embodiment, the provider may choose to establish appropriate support criteria relevant to this library that is customized for the particular customer.

Figure 3:
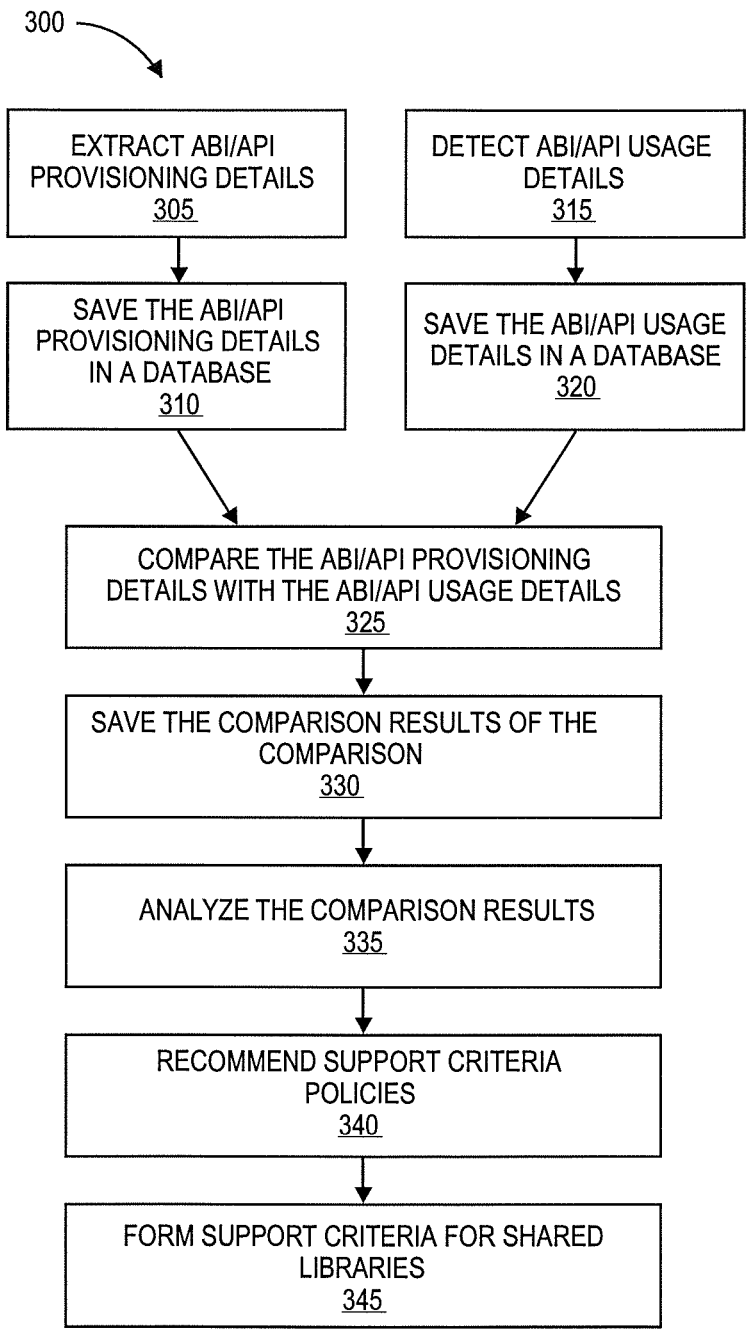
FIG. 3 illustrates a method for conducting application binary interface/application programming interface management according to one embodiment of the invention.

FIG. 3 illustrates a method for conducting ABI/API management according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by ABI/API management mechanism of FIG. 1.

Method 300 starts at block 305 with finding and extracting of ABIs and APIs and their associated metadata by an ABI/API extractor. This ABI/API provisioning detail is then saved in a database at block 310. At block 315, usage detail of various ABIs and APIs associated with shared libraries as determined from their use by third-party software programs is detected. At block 320, this ABI/API usage detail is stored at the database. At block 325, in one embodiment, the ABI/API usage detail is compared with the ABI/API provisioning detail to determine the importance level of each shared library based, for example, on the frequency by with a shared library is accessed and used by any number of third-party software programs. ABIs and APIs may generally refer to data identifying names, locations, IDs, versions, etc. At block 330, these comparison results are stored in the database.

At block 335, the comparison results are analyzed. These analyses include assigning a priority level to each shared library based on its determined importance level as set forth in the comparison results. As discussed previously, for example, a shared library may be assigned high importance if it is accessed and used by a large number of third-party software programs or frequently accessed and used by only a small number of third-party software programs. Further, importance and priority level may be directly proportional to each other; for example, the higher the importance of a shared library, the higher the priority level assigned to it.

At block 340, based on the analysis of the comparison results, support criteria policy recommendations may be provided to the provider. These support criteria policy recommendations may consider other relevant, but optional, factors, such as user-defined predetermined conditions, customer requests, customer history, system bandwidth, and/or third-party software program usage history, etc. Based on these policy recommendations and other relevant factors (e.g., customer loyalty, future (anticipated) use of a shared library, etc.), the provider may form and provide (to its customers) appropriate support criteria for each of the shared libraries at block 345.

Figure 4:
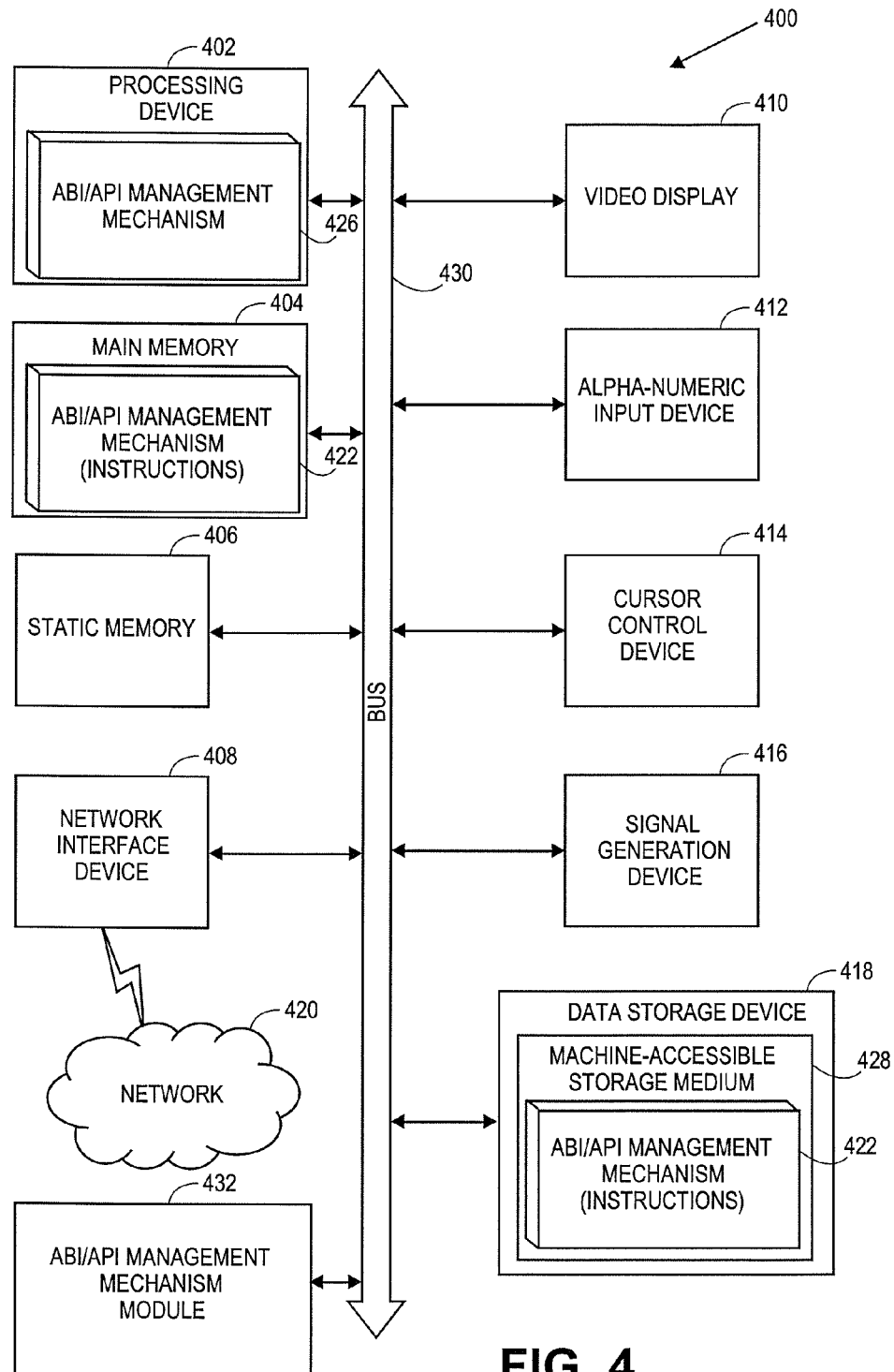
FIG. 4 illustrates a computing system according to one embodiment of the invention.

FIG. 4 illustrates a computing system 400 employing an ABI/API management mechanism according to one embodiment of the invention. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, RAM, dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computing system 400 may further include a network interface device 408. The computing system 400 also may include a video display unit 410 (e.g., a liquid crystal display (LCD) or a cathode ray tube (CRT)) connected to the computing system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., ABI/API management mechanism) embodying any one or more of the methodologies or functions described herein. The ABI/API management mechanism may also reside, completely or at least partially, within the main memory 404 (e.g., ABI/API management mechanism (instructions) 422) and/or within the processing device 402 (e.g., ABI/API management mechanism (processing logic) 426) during execution thereof by the computing system 400, the main memory 404 and the processing device 402 also constituting machine-readable storage media. Further, for example, the ABI/API management mechanism instructions 422 may be transmitted or received over a network 420 via the network interface device 408.

The machine-readable storage medium 428 may also be used to store the ABI/API management mechanism (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

ABI/API management mechanism modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "extracting", "detecting", "comparing", "analyzing", "saving", "storing", "receiving", "monitoring", "communicating", "accessing", "providing", "facilitating" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computing system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
    extracting interface provisioning detail relating to interfaces associated with shared libraries provided by an operating system running on a computer system;
    detecting interface usage detail associated with the interfaces, wherein the interface usage detail is in view of a frequency at which the interfaces are used by software programs running on the operating system;
    comparing the interface provisioning detail with the interface usage detail to determine an importance level of each of the shared libraries; and
    assigning, by a processing device of the computer system in view of the comparing, a priority level to each shared library in the shared libraries in view of the importance level of the shared library.

2. The method of claim 1, wherein the interfaces further comprise application programming interfaces (APIs).

3. The method of claim 1, wherein the interface provisioning detail comprises a list of the interfaces associated with the shared libraries and metadata providing relevant information about the interfaces in the list.

4. The method of claim 1, further comprising providing, to a provider, support criteria policy recommendations regarding the shared libraries, wherein the provider comprises an entity that creates and provides the operating system.

5. The computer-implemented method of claim 4, wherein the provider is to customize support criteria for the shared libraries based, at least partially, on the support criteria policy recommendations.

6. The method of claim 5, wherein the support criteria are customized based, at least partially, on one or more of customer requests, customer history, user-defined predetermined criteria, anticipated future use of the shared libraries, or historical use of the shared libraries.

7. The method of claim 1, wherein the interfaces correspond to operating system functions associated with the shared libraries, wherein the operating system functions relate to one or more of file accesses, networking capabilities, user interface functions, thread management, process management, or common utilities.

8. The computer-implemented method of claim 1, wherein the interface usage detail is further in view of a frequency at which the interfaces are used by one or more local software programs that are part of the operating system and independent of one or more third-party software programs.

9. A system comprising:
a host computing device having a memory to store instructions for interface management, and a processing device to execute the instructions, wherein the instructions cause the processing device to:
extract interface provisioning detail relating to interfaces associated with shared libraries provided by an operating system running on a computer system;
detect interface usage detail associated with the interfaces, wherein the interface usage detail is in view of a frequency at which the interfaces are used by software programs running on the operating system;
compare the interface provisioning detail with the interface usage detail to determine an importance level of each of the shared libraries; and
assign, by the processing device of the computer system in view of the comparison, a priority level to each shared library in the shared libraries in view of the importance level of the shared library.

10. The system of claim 9, wherein the interfaces further comprise application programming interfaces (APIs).

11. The system of claim 9, wherein the interface provisioning detail comprises a list of the interfaces associated with the shared libraries and metadata providing relevant information about the interfaces in the list.

12. The system of claim 9, further comprising providing, to a provider, support criteria policy recommendations regarding the shared libraries, wherein the provider comprises an entity that creates and provides the operating system.

13. The system of claim 12, wherein the provider is to customize support criteria for the shared libraries based, at least partially, on the support criteria policy recommendations.

14. The system of claim 13, wherein the support criteria are customized based, at least partially, on one or more of customer requests, customer history, user-defined predetermined criteria, anticipated future use of the shared libraries, or historical use of the shared libraries.

15. The system of claim 9, wherein the interfaces correspond to operating system functions associated with the shared libraries, wherein the operating system functions relate to one or more of file accesses, networking capabilities, user interface functions, thread management, process management, or common utilities.

16. A non-transitory machine-readable medium including instructions that, when executed by a processing device, cause the processing device to perform operations comprising:
extracting interface provisioning detail relating to interfaces associated with shared libraries provided by an operating system running on a computer system;
detecting interface usage detail associated with the interfaces, wherein the interface usage detail is in view of a frequency at which the interfaces are used by software programs running on the operating system;
comparing the interface provisioning detail with the interface usage detail to determine an importance level of each of the shared libraries; and
assigning, by the processing device of the computer system in view of the comparing, a priority level to each shared library in the shared libraries in view of the importance level of the shared library.

17. The machine-readable medium of claim 16, wherein the interfaces further comprise application programming interfaces (APIs).

18. The machine-readable medium of claim 16, wherein the interface provisioning detail comprises a list of the interfaces associated with the shared libraries and metadata providing relevant information about the interfaces in the list.

19. The machine-readable medium of claim 16, further comprising providing, to a provider, support criteria policy recommendations regarding the shared libraries, wherein the provider comprises an entity that creates and provides the operating system.

20. The machine-readable medium of claim 16, wherein the interface usage detail is further in view of a frequency at which the interfaces are used by one or more local software programs that are part of the operating system and independent of one or more third-party software programs.

* * * * *